United States Patent [19]

Stove

[11] Patent Number: 5,187,484
[45] Date of Patent: Feb. 16, 1993

[54] LINEARIZING A SWEPT-FREQUENCY RADAR

[75] Inventor: Andrew G. Stove, Reigate, England

[73] Assignee: U.S. Philips Corporation, New York, N.Y.

[21] Appl. No.: 829,790

[22] Filed: Jan. 31, 1992

[30] Foreign Application Priority Data

Feb. 26, 1991 [GB] United Kingdom ............... 9103945

[51] Int. Cl.$^5$ ..................... G01S 7/03; G01S 13/34
[52] U.S. Cl. ................................................. 342/200
[58] Field of Search ............................ 342/128, 200

[56] References Cited

U.S. PATENT DOCUMENTS

| | | | |
|---|---|---|---|
| 4,503,433 | 3/1985 | Tomasi | 342/128 |
| 4,692,766 | 9/1987 | Rolfs | 342/200 |
| 4,968,968 | 11/1990 | Taylor | 342/128 X |

Primary Examiner—T. H. Tubbesing
Attorney, Agent, or Firm—Robert J. Kraus

[57] ABSTRACT

The frequency-versus-time characteristic of the output signal of a swept-frequency radar is linearized by determining departures from linearity of the phase-versus-time characteristic of the beat signal obtained between an actual return from a selected radar target and a sample of the current radar output signal, and applying oppositely-directed corrections to the frequency-versus-time characteristic. The relevant beat signal is selected from the output signal of a mixer (8) by performing special analysis in a Fast Fourier Transform (FFT) calculating circuit (15) and then performing an inverse FFT on a windowed portion of the FFT obtained. A second or higher-order polynomial is then fitted to the phase-versus-time characteristic of the selected beat signal after it has been expressed as time versus phase, and correction terms are derived from the coefficients of this polynomial. The radar output signal is generated by a voltage-controlled oscillator (1) controlled by a control voltage generator (7). The generator comprises a voltage source (27) and a cascade combination of integrators (18,19,20) outputs of which are connected to a voltage summing circuit (13) via respective multipliers (32,33,34,35). The correction terms are applied as multiplication factors to the higher-order multipliers (33,34,35).

9 Claims, 2 Drawing Sheets

LINEARIZING A SWEPT-FREQUENCY RADAR

BACKGROUND OF THE INVENTION

The present invention relates to a method of, and apparatus for, reducing non-linearity (if any) present in the frequency-versus-time characteristic of the output signal of a swept-frequency radar transmitter.

Swept-frequency radar apparatuses which transmit an output signal which has a substantially linear frequency-versus-time characteristic during each frequency sweep are well-known. If the current output signal is mixed with a version of said output signal which has been transmitted and reflected back by a target a beat signal results, because the frequency of the output signal will have changed during the time taken by the transmitted output signal to travel to the target and back again. The frequency of the beat signal arising from reflection by a particular target will therefore be representative of the range of that target if the velocity of the target relative to the radar apparatus is zero, or will be representative of a combination of the range and the relative velocity of the target otherwise, because any non-zero relative velocity will give rise to a Doppler frequency shift in the reflected signal. Thus analysis of the beat signal into its respective frequency components will yield range/relative velocity information about any target which has given rise to a reflection.

It will be appreciated that a given target at constant range will only give rise to a constant beat frequency if the frequency-versus-time characteristic of the radar transmitter output signal is accurately linear. Any increase or decrease of the (positive or negative) rate of change of frequency during a given frequency sweep will give rise to an increase or decrease respectively in the frequency of each frequency component of the beat signal during that sweep, effectively resulting in the spreading of each frequency component and hence in a decrease in the resolution of the range/velocity information contained therein.

In order to optimize the frequency sweep linearity it is known from, for example, a paper "On performance of a linear FM radar transmitter at 35 GHz" by P. Z. Peebles and A. H. Green at pages 4-10 of Proc. IEEE Southeast Con. 1982 to employ a closed-loop feedback system to provide dynamic correction. To this end the output signal of the radar transmitter is applied directly to one input of a mixer and also to the other input of the mixer via a delay line having a small delay relative to the repetition period of the (periodic) frequency sweeps of the output signal. The resulting output of the mixer is a beat signal which ideally (if the frequency-versus-time characteristic of the output signal is perfectly linear) has a constant frequency $f_o$ equal to the product of the delay produced by the delay device and the rate of change of frequency of the output signal. This beat signal is applied to what is in effect a frequency discriminator tuned to $f_o$ and the discriminator output signal is combined with the (sawtooth) modulation waveform which produces the frequency sweeps in the output signal in such a sense as to reduce any deviation of the frequency of the beat signal from $f_o$. Thus any non-linearity in the frequency-versus-time characteristic of the output signal, which non-linearity gives rise to a deviation in the frequency of the beat signal from $f_o$, results in a modification to the modulation waveform such as to reduce the non-linearity. The control loop in effect continuously maintains the rate of change of frequency of the transmitter output signal at a value such that the frequency of the resulting beat signal is $f_o$.

A disadvantage of the known feedback system, at least in some potential applications, such as automotive radar, is the cost and/or bulk of the additional microwave or high-frequency components required thereby, e.g. the delay line and the means by which the delay line is coupled to the remainder of the apparatus.

SUMMARY OF THE INVENTION

It is an object of the present invention to mitigate this disadvantage.

According to one aspect of the present invention there is provided a method of reducing non-linearity (if any) present in the frequency-versus-time characteristic of the output signal of a swept-frequency radar transmitter, which output signal is derived from a radio-frequency source the output frequency of which is dependent on the value of a control signal applied in operation to a control signal input of said source, the output of a control signal generator being coupled to said control signal input for applying said control signal thereto to repeatedly sweep the frequency of said output signal, in which method said output signal is mixed with a delayed version thereof to yield a beat signal and said characteristic is adjusted in accordance with any variation of a frequency of this beat signal occurring during individual frequency sweeps of said output signal, characterized in that said control signal is formed by combining a time-independent component and n individually weighted time-dependent components, where n is greater than one, where the first time-dependent component is derived from the output of a single resettable analog integrator circuit which is fed from the output of a d.c. reference source and where the mth time-dependent component (m=2, ... n) is derived from the output of a cascade combination of m resettable analog integrator circuits which is fed from the output of a d.c. reference source, in that the delayed version of the transmitter output signal is constituted by a version of this output signal which has been transmitted and reflected back by a target or targets, in that the cumulative-and-normalized-phase versus time characteristic of a specific spectral component of said beat signal is determined for an individual frequency sweep of said transmitter output signal, in that the coefficients of the first, ... nth order terms of an nth order polynomial which fits the dependence of said control signal on said cumulative and normalized phase are determined from said cumulative-and-normalized-phase versus time characteristic and the concomitant variation of said control signal with time, and in that the coefficients so determined are used to update the weighting coefficients of the first, ... nth said time-dependent components respectively to reduce any said non-linearity.

It has now been recognized that it is not essential to provide a dedicated delay line to create a reference signal for mixing with the current output signal of the radar transmitter; the transmitter output signal may itself be used for this purpose after transmitting it to and receiving it back from a suitable reflecting target. The resulting beat signal will, of course, no longer have a predetermined average frequency, (unless the same stationary target is always employed) but changes occurring in the actual frequency thereof during individual frequency sweeps of the transmitter output signal will still be indicative of sweep non-linearity and hence of the adjustments required to the frequency-versus-time characteristic of the transmitter output signal. These beat signal frequency changes manifest themselves as non-linearities in the cumulative phase versus elapsed time characteristic of the beat signal during the individual frequency sweeps, and it has now been recognized that, if this characteristic is measured, thereby providing information on the basis of which the requisite adjustment can be carried out, the various values of cumulative phase in the measured characteristic can furthermore be normalized, i.e. can each be divided by the value which the cumulative phase has a specific time after the beginning of the relevant frequency sweep, for example at the end thereof, without loss of the required information. After normalization the same characteristic will result whatever the basic beat frequency is, i.e. whatever the range of the corresponding target is. Once the cumulative and normalized phase versus elapsed time characteristic of the beat signal has been determined for an individual frequency sweep of the transmitter output signal, the dependence of the cumulative and normalized phase on the value of the frequency control signal for the transmitter radio-frequency source, and hence the dependence of said control signal on said cumulative and normalized phase, can be worked out from a knowledge of how this control signal varied with elapsed time during the same sweep. It will be evident that, in order to produce a beat signal of constant frequency during a subsequent frequency sweep, i.e. a beat signal which has a linear cumulative and normalized phase characteristic, the frequency control signal for the radio-frequency source should vary during that sweep in such a manner that it is the same function of normalized elapsed time as it has been found to be of normalized beat signal cumulative phase. Thus a knowledge of how the control signal depends on beat signal normalized cumulative phase during a given frequency sweep provides directly a knowledge of how the control signal should be made to depend on normalized elapsed time during subsequent frequency sweeps.

According to another aspect of the present invention, there is provided a radar apparatus comprising a radio-frequency source having an output coupled to signal operating means for radiating a transmitter signal and for receiving at least a return signal, a control signal generator having an output coupled to a frequency control signal input of said radio-frequency source for applying a frequency control signal to said input to repeatedly sweep the frequency of the output signal of said source, and a mixer having a first input coupled to the signal operating means for receiving a version of the output signal of said source which has been transmitted and reflected back by a target or targets, a second input coupled to the output of said radio-frequency source for receiving a sample of the output signal of said source as a reference signal, and an output for a beat signal between said version of the output signal of said source and said sample, said control signal generator comprising component combining means for combining a time-independent component and n individually weighted time-dependent components to form said frequency control signal, where n is greater than one, a resettable analog integrator circuit arrangement for generating said time-dependent components, and means for individually weighting each said time-dependent component, said component combining means having a respective input corresponding to each said time-dependent component and said resettable analog integrator circuit arrangement comprising a single resettable analog integrator circuit included between the output of a d.c. reference source and the combining means input for the first time-dependent component and a cascade combination of m resettable analog integrator circuits included between the output of a d.c. reference source and the combining means input for the mth time-dependent component (m=2, ... ,n), the apparatus further including means for determining the cumulative-and-normalized-phase versus time characteristic of a specific spectral component of the mixer output signal for an individual frequency sweep of the radio-frequency source, means for determining the coefficients of the first, ... nth order terms of an nth order polynomial which fits the dependence of said frequency control signal on said cumulative-and-normalized-phase from said cumulative-and-normalized-phase versus time characteristic and the concomitant variation of said control signal with time, and means for updating the weighting coefficients of the first, ... ,nth said time-dependent components in accordance with the coefficients of the first .. . ,nth order terms respectively so determined to reduce non-linearity (if any) present in the frequency sweeps of the output signal of said radio-frequency source.

BRIEF DESCRIPTION OF THE DRAWINGS

Embodiments of the invention will now be described, by way of example, with reference to the accompanying diagrammatic drawings, in which.

DESCRIPTION OF THE PREFERRED EMBODIMENT

Figure 1:
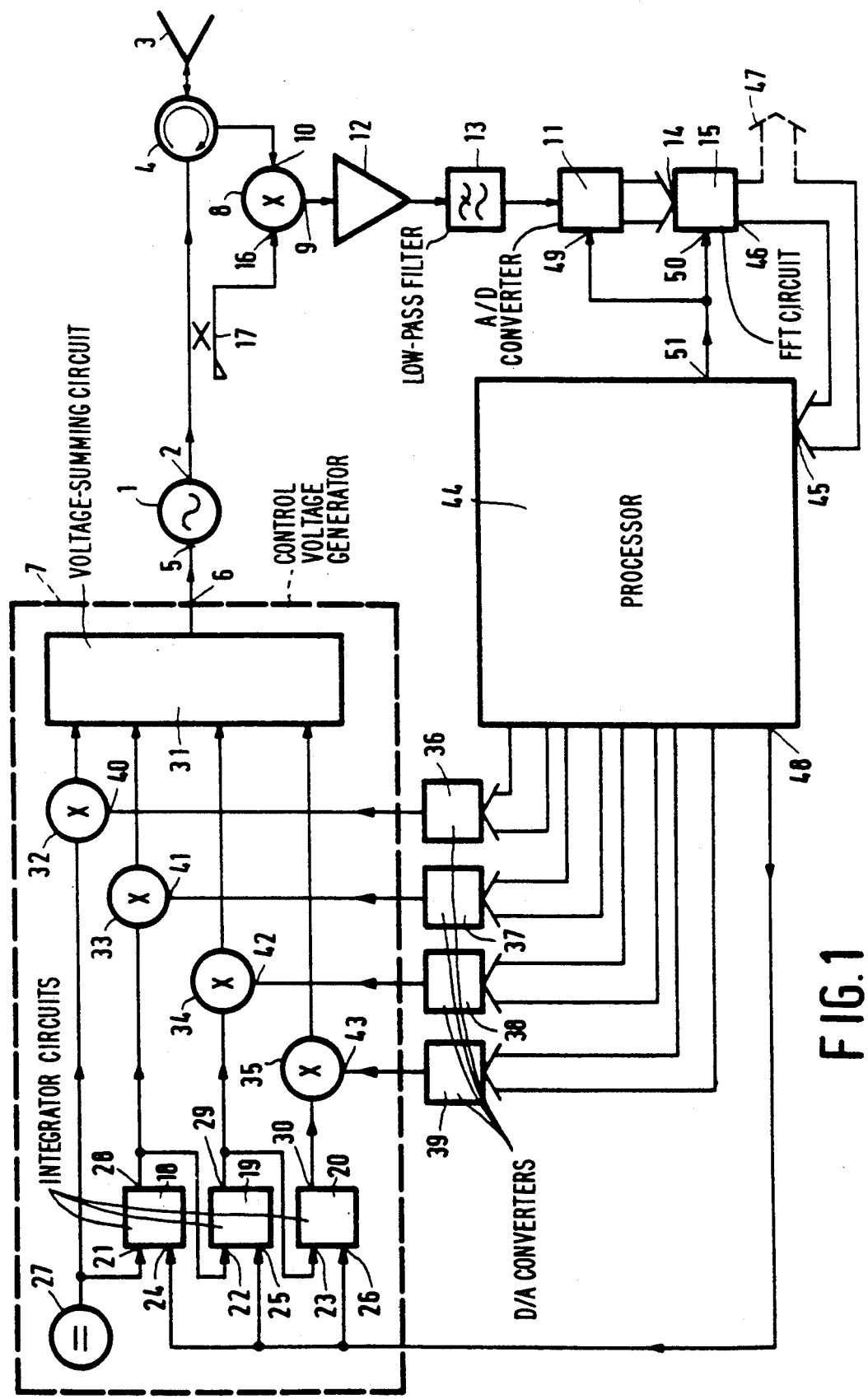
FIG. 1 is a block diagram of radar apparatus for implementing a method in accordance with the invention.

In FIG. 1 radar apparatus comprises a swept-frequency radar transmitter which includes a voltage-controlled r.f. oscillator 1 the output 2 of which is coupled to a transmit/receive aerial 3 via a circulator 4. The frequency control input 5 of oscillator 1 is fed from the output 6 of a control voltage generator 7.

A receiver portion of the radar apparatus includes a mixer 8 the output 9 of which is coupled to the input 14 of a Fast Fourier Transform (FFT) calculating circuit 15 via an amplifier 12, a low-pass filter 13 and an analog-to-digital converter 11. A first input 10 of mixer 8 is fed from the aerial 3 via circulator 4, and a second input 16 of mixer 8 is fed with a sample of the output signal of oscillator 1 via a coupler 17.

The output waveform of control voltage generator 7 is basically a linear sawtooth. On the assumption that the output frequency of oscillator 1 is linearly dependent upon the control voltage fed to its input 5 this output frequency in consequence basically repeatedly sweeps from a first frequency $F_0$ to a second frequency $F_1$ at a constant rate A. If the resulting signal transmitted from aerial 3 is reflected from an object at a range R and received back at the aerial 3 then, as is known, the difference between the instantaneous frequencies applied to the inputs 10 and 16 of mixer 8 (the instantaneous frequencies of the signal received by aerial 3 and of the output signal of oscillator 1 respectively) is equal to $2AR/c$, where c is the velocity of light, possibly Doppler-shifted due to relative motion between the radar apparatus and the reflecting object. The output signal of mixer 8 therefore has a component having this frequency $f_b$. After amplification by amplifier 12, low-pass filtering by filter 13 and conversion to digital form by converter 11, this output signal is applied to FFT calculating circuit 15. (2N-point) FFT calculating circuit 15, as is known, acts as a bank of N filters and in consequence performs a spectral analysis, producing a signal on that one of its N outputs which corresponds to a frequency range which includes the frequency $f_b$. The presence of a signal on this output therefore indicates the presence of a stationary reflecting object at the range R (or of a moving object at a range somewhat displaced from this range R). The simultaneous presence of a plurality of reflecting objects at different ranges will, of course, result in signals at a corresponding plurality of outputs of the circuit 15.

In practice the output frequency F of oscillator 1 will not be exactly linearly dependent upon the value of the control voltage applied to its input 5, with the result that, if the output signal of control signal generator 7 is a linear sawtooth, the rate of change A of this frequency will vary during the course of each frequency sweep. This means that the frequency of the component of the output signal of mixer 8 corresponding to each reflecting object will itself vary during the course of each frequency sweep, resulting in signals at adjacent outputs of FFT-calculating circuit 15; the range resolution of the radar apparatus will be impaired.

In order to improve matters in this respect the output waveform of control voltage generator 7 is automatically modified in such a manner as to compensate, at least partly, for the non-linear dependence of the output frequency of oscillator 1 on its control voltage, i.e. in such a manner as to improve the constancy of the rate of change A of the output frequency of oscillator 1 during the course of each frequency sweep. Each nominally linear ramp of the output voltage of generator 7 is distorted into a curve whose curvature takes the opposite form to the curve of output frequency of oscillator 1 against control voltage applied to input 5.

To enable this to be done generator 7 includes a cascade combination of, in the present case three, integrator circuits 18,19 and 20 having integration signal inputs 21,22 and 23 respectively, and reset signal inputs 24,25 and 26 respectively. Input 21 of circuit 18 is fed from a d.c. voltage source 27, and inputs 22 and 23 are fed from the outputs 28 and 29 of the circuits 18 and 19 respectively. The source 27, and the outputs 28, 29 and 30 of circuits 18,19 and 20 respectively, are coupled to respective inputs of a voltage summing circuit 31 via multipliers 32,33,34 and 35 respectively. The output of summing circuit 31 constitutes the output 6 of the generator circuit 7. If the multiplication factors of the multipliers 32,33,34 and 35 are $\alpha,\beta,\gamma$, and $\delta$ respectively, and the output voltage of source 27 is $V_{ref}$, the output voltage of summing circuit 31, i.e. of generator 7, at a time t after reset and subsequent release of the integrator circuits 18–20 will be $V_{ref}(\alpha+\beta t+\gamma t^2+\delta t^3)$. The first two terms correspond to the conventional linear voltage ramp starting from a voltage $V_{ref}\alpha$ and having a slope $V_{ref}\beta$. The terms in $\gamma$ and $\delta$ are quadratic and cubic correction terms respectively; quartic etc. correction terms could be added, or the cubic term could be omitted, if desired.

The multiplication factors $\alpha,\beta,\gamma$, and $\delta$ are generated by digital-to-analog converters 36,37,38 and 39 respectively and fed to inputs 40,41,42 and 43 of the multipliers 32,33,34 and 35 respectively. Converters 36 to 39 are fed with the appropriate digital data from respective output ports of a digital data processing arrangement 44 which is constituted by a suitably programmed microcomputer. A data input port 45 of processor 44 is fed from the output 46 of FFT-calculating circuit 15, which output may also be connected to the data input of a conventional radar data processing arrangement (not shown), as indicated by an arrow 47. Alternatively the conventional radar data processing may be performed by the arrangement 44. The reset inputs 24 to 26 of integrator circuits 18 to 20 are fed from an output 48 of arrangement 44. The clock inputs 49 and 50 of A/D-converter 11 and FFT-calculator 15 are fed from an output 51 of arrangement 44.

Arrangement 44 is programmed to momentarily reset integrator circuits 18 to 20 at intervals of 1 mS, except for during the first 10 mS of every second when it is programmed to maintain these circuits continuously in the reset state. Moreover it is programmed to apply 2N clock pulses to both A/D converter 11 and FFT-calculating circuit 15 during each millisecond, where N is the number of points calculated by circuit 15. Thus a 2N-point FFT is calculated by circuit 15 during each millisecond and is applied to the input port 45 of processor arrangement 44.

Arrangement 44 is programmed to write nominal values of $\alpha,\beta,\gamma$, and $\delta$ to the converters 36,37,38 and 39 respectively during the initialization phase, where the nominal $\gamma$ and $\delta$ may be zero and the nominal $\alpha$ and $\beta$ are chosen, taking into account the output voltage $V_{ref}$ of source 27, the time constant of integrator 18, and the frequency versus control voltage characteristic of oscillator 1, to give the required starting and finishing frequencies respectively of each 1 mS frequency sweep occurring at the output of oscillator 1 during the last 990 mS of each second in response to the reset signals applied to integrator circuit 18. (It is assumed that any value written to any of the converters 36 to 39 is maintained until it is subsequently updated). The starting frequency may lie, for example, in the region of 80 GHz and the finishing frequency may be, for example 300 MHz higher than the starting frequency.

As mentioned above, the integrator circuits 18 to 20 are maintained in the reset state during the first 10 mS of each second, so that the output frequency of oscillator 1 is maintained constant at the starting frequency during these intervals. During each of these intervals arrangement 44 is programmed to process the ten FFTs then produced by circuit 15 to ascertain what the current average (noise) signal level is at each of the N outputs of circuit 15, and update a record, kept within the arrangement 44, of the respective running averages of each of these N noise levels in accordance with the result. During each 1 mS of the remaining 990 mS of each second the arrangement 44 is programmed to perform the sequence of operations shown in the flow diagram of FIG. 2 of the drawings, for which purpose it will be assumed, for example, that FFT-calculating circuit 15 calculates an N=256-point FFT each time, giving an optimum range resolution for reflecting targets of about 0.5 meter and a maximum range of about 128 meters with the sweep rate of 300 MHz per mS previously quoted for the output signal of oscillator 1.

Figure 2:
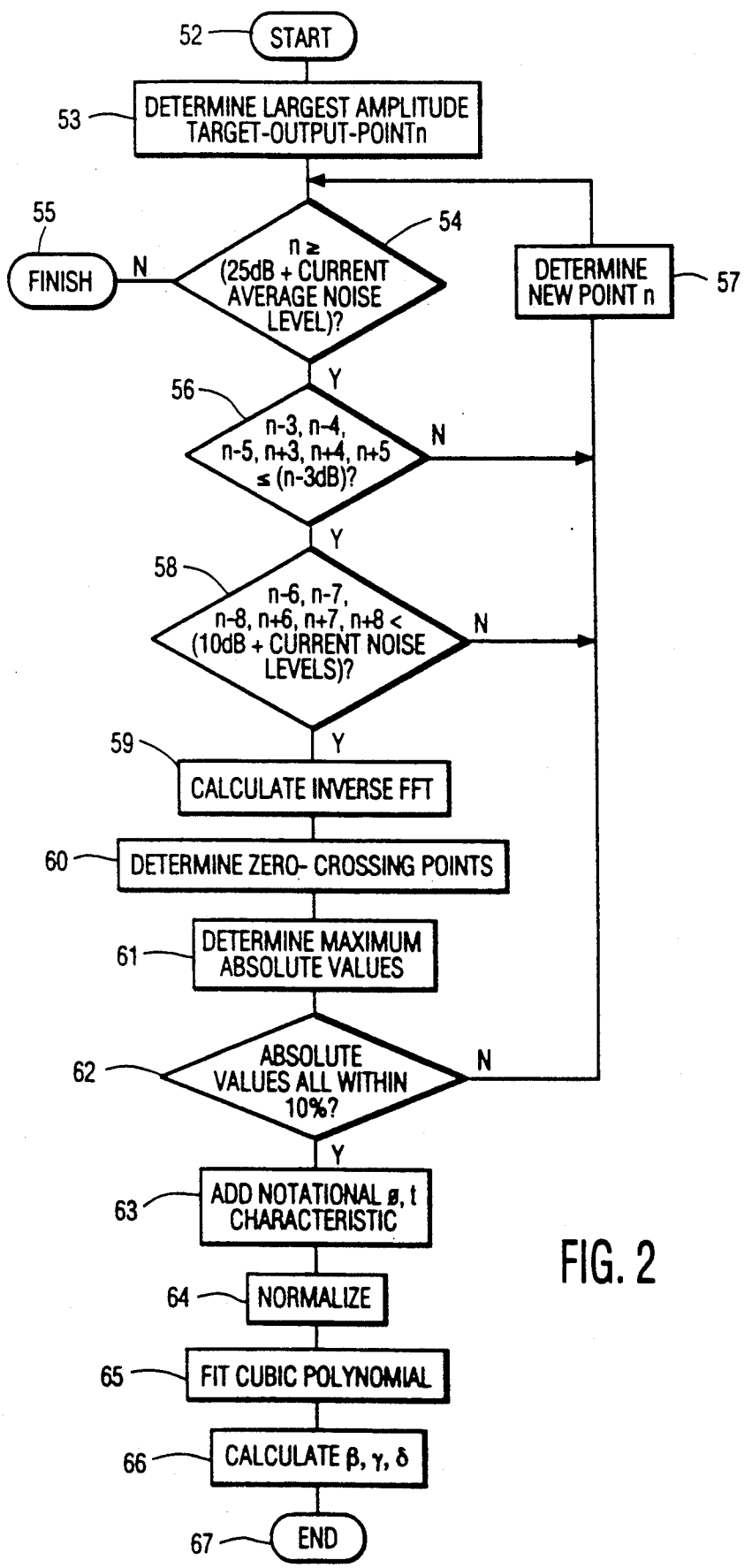
FIG. 2 is a flow diagram illustrating operations performed by a programmed microcomputer included in the apparatus of FIG. 1.

In FIG. 2 the various blocks have the following significances
52—Start

53—Determine that one of the output points 150 to 256 of FFT-calculating circuit 15 (corresponding to reflecting targets within the range 75 to 128 meters) which has the largest amplitude relative to the current average noise level for this point.

54—In the amplitude of this point n at least 25 dB above the current average noise level for this point?

55—Finish

56—Are the amplitudes of points $n-3$, $n-4$, $n-5$, $n+3$, $n+4$ and $n+5$ relative to the respective current average noise levels for these points all at least 3dB less than the relative amplitude of point n?

57—Determine as a new point n that one of the output points 150 to 256 of FFT-calculating circuit 15 which has the largest amplitude relative to the current average noise level for this point after any point which has already been tested in a test 54 during the present routine, together with its surrounding sixteen points, have been excluded from consideration.

58—Are the amplitudes of points $n-6$, $n-7$, $n-8$, $n+6$, $n+7$ and $n+8$ all less than 10dB above the current noise levels for the corresponding points?

59—Calculate a 64-point inverse Fast Fourier Transform on data the first thirty-two points and the final sixteen points of which are zero and points thirty-three to forty-eight of which are the amplitudes of output points $n-7$ to $n+8$ respective of the FFT-calculating circuit 15 relative to the current average noise levels for these points.

60—Determine the zero-crossing points of the inverse FFT calculated in step 59, i.e. positions on the inverse FFT where adjacent points have opposite signs, by straight-line interpolation between these points.

61—Determine the maximum absolute value of each set of points of the inverse FFT calculated in step 59 which lie between an adjacent pair of zero-crossing points determined in step 60.

62—Are the absolute values determined in step 61 all within 10% of each other?

63—Add a notional cumulative phase $\phi$ versus elapsed time t characteristic corresponding to a frequency $f_o$ to the cumulative phase $\phi$ versus elapsed time t characteristic determined in step 60, where $f_o$ is the frequency corresponding to the point $n-7$ processed in step 59.

64—Normalize the characteristic obtained in step 63, i.e. divide each of the values of cumulative phase $\phi$ by the maximum value $\phi_{max}$ of cumulative phase, and each of the values of elapsed time t by the maximum value $t_{max}$ of elapsed time.

65—Fit a cubic polynomial to the characteristic obtained in step 64 expressed as $t/t_{max}$ as a function of $\phi/\phi_{max}$.

66—Calculate values of $\beta, \gamma$ and $\delta$ from the coefficients of the polynomial found in step 65, and update respective running averages of these values.

67—End.

The processing arrangement 44 is moreover, programmed to write the current values of the running averages of $\beta, \gamma$ and $\delta$ to the converters 37, 38 and 39 of FIG. 1 at intervals of, for example, one minute.

Thus, each time the routine of FIG. 2 is performed it is ascertained by means of steps 53 to 58 whether a radar return having characteristics which render it basically suitable for revealing non-linearities in the frequency versus time characteristic of oscillator 1 is being received by the aerial 3. More particularly, steps 53 and 54 select a return (if present) which has an appropriately large amplitude, step 56 tests whether the corresponding target is no more than three range cells wide at the 3dB point, and step 58 tests whether the corresponding target is isolated in an area at least sixteen range cells wide which contains no other target. If these conditions are satisfied step 59 effectively constructs the time domain waveform of a beat signal between the relevant frequency component of the output signal of mixer 8 and a signal having a frequency $f_o$ corresponding to output point $n-7$ of the FFT-calculating circuit 15, the padding of the sixteen items of actual data with forty-eight zeros having a curve-smoothing function and the fact that this "zero-filling" is asymmetrical (the sixteen items of actual data being positioned at the bottom of the upper half of the inversely-transformed data items) ensuring that the last-mentioned beat signal has a positive frequency. The determination of the zero-crossing instants of this beat signal (the relevant frequency component of the output signal of mixer 8 translated to zero frequency due to the windowing of sixteen of the output points of FFT calculating circuit 11) in step 60 then gives the times at which successive increments of $\pi$ occur in its phase, i.e. gives points on its cumulative phase $\phi$ against elapsed time t characteristic. Steps 61 and 62 constitute a check on whether the depth of any amplitude modulation of the relevant frequency component translated to zero frequency is below a predetermined threshold (because excessive amplitude modulation would have produced errors in the positions of the zero crossings determined in step 60) and if all is well in this respect step 63 translates the cumulative phase versus elapsed time characteristic of the zero-translated frequency component obtained in step 60 into a cumulative phase versus elapsed time characteristic of the actual relevant frequency component of the output signal of mixer 8; a value $2\pi f_o t$, where t is the corresponding value of the elapsed time, is added to each cumulative phase value of the first-mentioned characteristic. After normalization of both axes of the resulting characteristic in step 64 a cubic polynomial $$t/t_{max} = \beta'(\phi/\phi_{max}) + \gamma'(\phi/\phi_{max})^2 + \delta'(\phi/\phi_{max})^3$$

is fitted to the resulting set of points (where it will be noted that the axes of the characteristic have effectively been transposed; the characteristic has effectively been inverted so that it takes the form of the corrections required rather than of the errors). An appropriate polynomial-fitting algorithm is obtainable, for example, from the National Algorithm Group, (NAG) of Oxford University under reference E02ACF. This particular algorithm fits the polynomial in such a way that the worst case deviation of any point therefrom is minimized, although of course some other criterion for best fit, e.g. minimizing the mean square deviation of the various points therefrom could alternatively be employed, if desired. The result is values for $\beta'$, $\gamma'$ and $\delta'$.

It can be shown that, in order to linearize the frequency versus time characteristic of the output signal of oscillator 1 in FIG. 1, its normalized control voltage $(V - V_o)/(V_{max} - V_o)$ should vary in the same way with normalized elapsed time $t/t_{max}$ as normalized elapsed time $t/t_{max}$ varies with normalized cumulative phase $\phi/\phi_{max}$ of the selected frequency component of the output signal of mixer 8. ($V_o$ is the value of the control voltage at the start of each frequency sweep, i.e. $V_{ref\alpha}$). Thus it is required in the present case that $$(V-V_o)/(V_{max}-V_o) = \alpha' + \beta'(t/t_{max}) + \gamma'(t/t_{max})^2 + \delta'(t/t_{max})^3$$

i.e. that $$V-V_o = \alpha'(V_{max}-V_o) + t\beta'(V_{max}-V_o)/t_{max} + t^2\gamma'(V_{max}-V_o)/(t_{max})^2 + t^3\delta'(V_{max}-V_o)/(t_{max})^3$$

Thus the coefficients $\beta, \gamma$ and $\delta$ which it is required be applied as multiplying factors to the multipliers 33,34 and 35 of FIG. 1 are given by $$\beta = \beta'(V_{max}-V_o)/(t_{max})$$

$$\gamma = \gamma'(V_{max}-V_o)/(t_{max})^2$$

$$\delta = \delta'(V_{max}-V_o)/(t_{max})^3.$$

These coefficients are calculated in step 66 from the values found for $\beta'$, $\gamma'$ and $\delta'$ together with the values of $(V_{max}-V_o)$ and $t_{max}$, $t_{max}$ being predetermined by the duration of each frequency sweep of the output signal of oscillator 1 and $(V_{max}-V_o)$ being predetermined by the required terminating frequency of each frequency sweep.

It was assumed above for the purposes of the description with reference to FIG. 2, in particular that with reference to steps 64 and 65 thereof, that the voltage ramps supplied by the control signal generator 7 of FIG. 1 to the frequency control signal input 5 of radio-frequency source 1 prior to each updating of the weighting coefficients applied to multipliers 33–35 are each sufficiently linear that they can be treated as such for the purpose of the calculation of the new values of $\beta, \gamma$ and $\delta$. (Such an assumption enables the amount of data processing required to be reduced below that which would otherwise be necessary). While such an assumption is obviously justified initially if, as postulated, the values of $\gamma$ and $\delta$ are initially set to zero, it may not be justified subsequently, especially if the output frequency versus frequency control voltage characteristic of r.f. signal source 1 is itself more than slightly non-linear. If this is the case a more rigorous calculation of each new set of values for $\beta$, $\gamma$ and $\delta$ may be performed in a manner which will now be described.

As mentioned previously, linearization of the frequency sweeps produced by source 1 entails in general that, for a given frequency sweep from source 1, the control voltage V applied to its input 5 be made to vary in substantially the same way with normalized elapsed time $t/t_{max}$ as it does with normalized cumulative phase $\phi/\phi_{max}$ of a beat frequency signal appearing in operation at the output 9 of mixer 8. If, for example, correction is required up to and including third order as in the example described previously, then the above requirements can be expressed mathematically as $$V = \alpha' + \beta'(t/t_{max}) + \gamma'(t/t_{max})^2 + \delta'(t/t_{max})^3 \quad (1)$$

where $\alpha', \beta', \gamma'$ and $\delta'$ also satisfy $$V = \alpha' + \beta'(\phi/\phi_{max}) + \gamma'(\phi/\phi_{max})^2 + \delta'(\phi/\phi_{max})^3 \quad (2)$$

(If desired $t_{max}$ and $\phi_{max}$ may be replaced by $t_r$ and $\phi_r$ respectively where $\phi_r$ is the value of the cumulative phase at an arbitrary elapsed time $t_r$ after the beginning of a given control voltage/r.f. output-frequency sweep). As mentioned previously, the output signal of the control signal generator 7 of FIG. 1 is given by $$V = V_{ref}(\alpha + \beta t + \gamma t^2 + \delta t^3) \quad (3)$$

so in general, for correction up to and including third order, it is required that $$V_{ref}\alpha = \alpha'$$

$$V_{ref}\beta = \beta'/t_{max}$$

$$V_{ref}\gamma = \gamma'/t^2_{max}$$

and $$V_{ref}\delta = \delta'/t^3_{max} \quad (4)$$

where $\alpha', \beta', \gamma'$ and $\delta'$ satisfy expression (2).

Thus the required values of $\beta, \gamma$ and $\delta$ can be calculated by (a) determining the cumulative normalized phase $\phi/\phi_{max}$ versus elapsed time t characteristic of a beat signal appearing at the output 9 of mixer 8 of FIG. 1 during a given frequency sweep of the output signal of the r.f. source 1, (b) substituting, using equation (3) and the present values of $\alpha, \beta, \gamma$ and $\delta$, the current corresponding value of V for each value of elapsed time t in the characteristic determined in (a) to give the corresponding cumulative normalized phase versus control voltage characteristic, i.e. pairs of values (V, $\phi/\phi_{max}$), (c) fitting a third-order polynomial to these values to obtain the coefficients $\beta', \gamma'$ and $\delta'$ in equation (2), and (d) using the equations (4) to derive the required value of $\beta, \gamma$ and $\delta$ from these coefficients. Thus if a more rigorous determination of the required values of $\beta, \gamma$ and $\delta$ is required, steps 64 and 65 of FIG. 2 as previously defined may be replaced by 64—(a) Normalize the cumulative phases in the characteristic obtained in step 63, i.e. divide each of the values of cumulative phase $\phi$ by the maximum value of cumulative phase, and (b) substitute corresponding values of V for the times obtained in step 63.

65—Fit a cubic polynomial to the characteristic obtained in step 64 expressed as V as a function of $\phi/\phi_{max}$.

It will be noted that the major data processing burden added by the substitution of the above operations for the operations 64 and 65 originally described with reference to FIG. 2 lies in the calculation of the corresponding value of V for each value of time t in the characteristic obtained in step 63. If it were assumed that the voltage ramps generated by control voltage generator 7 is linear prior to the normalization process, then of course normalized control voltage $(V-V_o)/(V_{max}-V_o)$ could be substituted directly for normalized elapsed time, which is the reason that elapsed time is normalized in the step 64 originally described and that this step contains no actual substitution of control voltage values for time values.

As mentioned previously the beat frequency which results from reflection by a target at a given range will be Doppler-shifted if there is relative motion between the target and the radar apparatus. There is an implicit assumption in step 63 of FIG. 2 that the frequency $f_o$ employed therein is not significantly Doppler-shifted. If significant Doppler shift is in fact possible its effects can be ascertained, enabling correction to be made therefor, by the known technique of arranging that oscillator 1 of FIG. 1 generates both upwardly-directed and downwardly-directed frequency sweeps, these giving rise to oppositely directed Doppler shifts in the beat frequency due to a given target, and thereby enabling the true beat frequency to be ascertained by an averaging process.

It will be evident that many modifications are possible to the embodiment described, within the scope of the invention as defined by the claims. For example, the fact that correction terms up to and including third-order are employed is not essential; even higher-order terms may be employed, if desired, or the third order correction may be omitted. Obviously the number of integrators and associated multipliers included in the control voltage generator 7 of FIG. 1 should be chosen in accordance with the order of correction provided for in each particular case. Moreover, although the multipliers 33,34 and 35 are shown being fed from respective taps on the cascade arrangement of integrators 18,19,20 it will be evident that these multipliers could alternatively be fed from completely separate sets of one, two and three integrators respectively, which sets could, if desired, be fed with input voltages which differ from each other and from the voltage fed to multiplier 32. If such different input voltages are employed obviously equations (3) and (4) and the calculations employing these equations will have to be modified to take this into account, i.e. to take into account the difference values of $V_{ref}$ associated with the respective weighting coefficients $\alpha, \beta, \gamma$ and $\delta$. Furthermore the weighting of the various components of the control voltage generator output signal may then be achieved by adjusting the various $V_{ref}$ if desired, rather than by means of the multipliers 33,34 and 35 which may then be omitted. As another example, the screening of the selected frequency component for amplitude modulation (step 62 in FIG. 2) is, although highly desirable, not essential. It should be borne in mind though that high degrees of amplitude modulation (due e.g. to the presence of multiple targets at the relevant range) can result in large errors when the phase versus frequency characteristic is determined in step 60. Indeed, if the modulation depth is greater than 100% spurious actual phase reversals will occur. As yet another example it is not essential to employ asymmetrical "zero fill" in step 59, or even "zero fill" at all. However, as pointed out previously, "zero fill" has a curve-smoothing effect and, if it is made asymmetrical, it enables positive and negative frequencies of the zero-translated selected frequency component to be differentiated between. An alternative way of achieving such differentiation would be, of course, to calculate complex rather than simple forward and inverse Fourier Transforms. However this would necessitate the replacement of the single mixer 8 of FIG. 1 by a pair of quadrature-related mixers and associated output channels, so that the asymmetrical zero-fill technique will often be preferred. (As an alternative to positioning the sixteen actual data points at the bottom of the upper half of the 64-point transform performed in step 59 they could be positioned at the top of the bottom half, in which case the frequency $f_o$ used in step 63 should correspond to point $n+8$ processed in step 59, rather than point $n-7$).

The specific figures quoted for various aspects of the embodiment described, e.g. number of points in each FFT calculated by circuit 11, number of points in each inverse FFT calculated by arrangement 44, duration and frequency of each receiver noise determining step carried out in response to the program of the arrangement 44, specific criteria employed in selecting a particular frequency component of the output signal of mixer 8, etc. etc., are of course only examples, and may be varied as desired in accordance with the prevailing circumstances.

Further, in FIG. 1 the aerial 3 and the circulator 4 may be replaced by separate transmit and receive aerials connected respectively to the output 2 of the oscillator 1 and to the first input 10 of the mixer 8.

From reading the present disclosure, other modifications and variations will be apparent to persons skilled in the art. Such modifications and variations may involve other features which are already known in the context of radar apparatuses and data processing therein and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of reducing non-linearity (if any) present in the frequency-versus-time characteristic of the output signal of a swept-frequency radar transmitter, which output signal is derived from a radio-frequency source the output frequency of which is dependent on the value of a control signal applied in operation to a control signal input of said source, the output of a control signal generator being coupled to said control signal input for applying said control signal thereto to repeatedly sweep the frequency of said output signal, in which method said output signal is mixed with a delayed version thereof to yield a beat signal and said characteristic is adjusted in accordance with any variation of a frequency of this beat signal occurring during individual frequency sweeps of said output signal, characterized in that said control signal is formed by combining a time-independent component and n individually weighted time-dependent components, where n is greater than one, where the first time-dependent component is derived from the output of a single resettable analog integrator circuit which is fed from the output of a d.c. reference source and where the mth time-dependent component (m=2, ... n) is derived from the output of a cascade combination of m resettable analog integrator circuits which is fed from the output of a d.c. reference source, in that the delayed version of the transmitter output signal is constituted by a version of this output signal which has been transmitted and reflected back by a target or targets, in that the cumulative-and-normalized-phase versus time characteristic of a specific spectral component of said beat signal is determined for an individual frequency sweep of said transmitter output signal, in that the coefficients of the first, ... nth order terms of an nth order polynomial which fits the dependence of said control signal on said cumulative and normalized phase are determined from said cumulative-and-normalized-phase versus time characteristic and the concomitant variation of said control signal with time, and in that the coefficients so determined are used to update the weighting coefficients of the first, . . . nth said time-dependent components respectively to reduce any said non-linearity.

2. A method as claimed in claim 1, wherein said beat signal is analyzed into its spectral components by calculating a Fourier Transform of said beat signal, and data defining said specific spectral component is derived from said Fourier Transform by calculating an inverse Fourier Transform of a windowed portion thereof.

3. A method as claimed in claim 2, wherein the calculated inverse Fourier Transform is of said windowed portion supplemented with zero data.

4. A method as claimed in claim 3, wherein the supplementation with zero data is asymmetrical.

5. A method as claimed in claim 4, wherein said windowed portion is selected on the basis that a single isolated frequency component is indicated therein.

6. A method as claimed in claim 3, wherein said windowed portion is selected on the basis that a single isolated frequency component is indicated therein.

7. A method as claimed in claim 2, wherein said windowed portion is selected on the basis that a single isolated frequency component is indicated therein.

8. Radar apparatus comprising a radio-frequency source having an output coupled to signal operating means for radiating a transitter signal and for receiving at least a return signal, a control signal generator having an output coupled to a frequency control signal input of said radio-frequency source for applying a frequency control signal to said input to repeatedly sweep the frequency of the output signal of said source, and a mixer having a first input coupled to the signal operating means for receiving a version of the output signal of said source which has been transmitted and reflected back by a target or targets, a second input coupled to the output of said radio-frequency source for receiving a sample of the output signal of said source as a reference signal, and an output for a beat signal between said version of the output signal of said source and said sample, said control signal generator comprising component combining means for combining a time-independent component and n individually weighted time-dependent components to form said frequency control signal, where n is greater than one, a resettable analog integrator circuit arrangement for generating said time-dependent components, and means for individually weighting each said time-dependent component, said component combining means having a respective input corresponding to each said time-dependent component and said resettable analog integrator circuit arrangement comprising a single resettable analog integrator circuit included between the output of a d.c. reference source and the combining means input for the first time-dependent component and a cascade combination of m resettable analog integrator circuits included between the output of a d.c. reference source and the combining means input for the mth time-dependent component (m=2, . . . , n), the apparatus further including processor means for determining the cumulative-and-normalized-phase versus time characteristic of a specific spectral component of the mixer output signal for an individual frequency sweep of the radio-frequency source, for determining the coefficients of the first, . . . nth order terms of an nth order polynomial which fits the dependence of said frequency control signal on said cumulative-and-normalized-phase from said cumulative-and-normalized-phase versus time characteristic and the concomitant variation of said control signal with time, and for updating the weighting coefficients of the first, . . . , nth said time-dependent components in accordance with the coefficients of the first . . . , nth order terms respectively so determined to reduce non-linearity (if any) present in the frequency sweeps of the output signal of said radio-frequency source.

9. An apparatus as claimed in claim 8, further comprising analyzing means for analyzing said beat signal into its spectral components by calculating a Fourier Transform of said beat signal, said processor means being adapted to calculate an inverse Fourier Transform of a windowed portion of the Fourier Transform to derive data defining said specific spectral component.

* * * * *